United States Patent
Anastasiev et al.

(10) Patent No.: US 11,169,923 B2
(45) Date of Patent: Nov. 9, 2021

(54) METHOD FOR PERFORMING READ-AHEAD IN DATA STORAGE SYSTEMS

(71) Applicant: RAIDIX, St. Petersburg (RU)

(72) Inventors: Evgeny Evgenievich Anastasiev, St. Petersburg (RU); Svetlana Viktorovna Lazareva, St. Petersburg (RU)

(73) Assignee: RAIDIX, St. Petersburg (RU)

( * ) Notice: Subject to any disclaimer, the term of this patent is extended or adjusted under 35 U.S.C. 154(b) by 0 days.

(21) Appl. No.: 16/766,932

(22) PCT Filed: Jul. 16, 2018

(86) PCT No.: PCT/RU2018/000470
§ 371 (c)(1),
(2) Date: May 26, 2020

(87) PCT Pub. No.: WO2019/103647
PCT Pub. Date: May 31, 2019

(65) Prior Publication Data
US 2020/0371942 A1 Nov. 26, 2020

(30) Foreign Application Priority Data

Nov. 27, 2017 (RU) ........................... RU2017141340

(51) Int. Cl.
*G06F 12/0862* (2016.01)
*G06F 11/30* (2006.01)
*G06F 12/02* (2006.01)

(52) U.S. Cl.
CPC ...... *G06F 12/0862* (2013.01); *G06F 11/3037* (2013.01); *G06F 12/0215* (2013.01); *G06F 12/0246* (2013.01)

(58) Field of Classification Search
None
See application file for complete search history.

(56) References Cited

U.S. PATENT DOCUMENTS

| 5,619,723 | A | 4/1997 | Jones |
|---|---|---|---|
| 8,732,406 | B1 | 5/2014 | Pase |
| 9,311,021 | B1 | 4/2016 | Shah |
| 2004/0205298 | A1* | 10/2004 | Bearden .............. G06F 12/0862 711/137 |
| 2004/0205299 | A1* | 10/2004 | Bearden .............. G06F 12/0862 711/137 |
| 2014/0250268 | A1 | 9/2014 | Traut |
| 2015/0032967 | A1 | 1/2015 | Udayashankar |

* cited by examiner

*Primary Examiner* — Jared I Rutz
*Assistant Examiner* — Marwan Ayash
(74) *Attorney, Agent, or Firm* — Mestechkin Law Group P.C.

(57) ABSTRACT

The method for performing read-ahead operations in the data storage systems is disclosed and includes determining a sequential address space interval of a request and a time of the request, placing the data into a read-ahead interval list if the address space interval exceeds a threshold, and placing the data about request intervals having a length shorter than the threshold into a random request interval list, identifying a partial overlap between the address space interval of the current request and the interval stored in one of the lists, verifying whether the length of the address space interval exceeds a threshold and if so—placing the data about this sequential interval into the read-ahead interval list, performing read-ahead of data.

21 Claims, 5 Drawing Sheets

METHOD FOR PERFORMING READ-AHEAD IN DATA STORAGE SYSTEMS

PRIORITY DATA

The present application claims priority to Russian Federation Application No. 2017141340, filed on Nov. 27, 2017, which is incorporated herein by reference.

FIELD OF INVENTION

The invention disclosed in the present is directed to data distribution and storage method and systems, more specifically, to methods and apparatus for performing read-ahead operations in the data storage systems.

PRIOR ART

The performance of the data storage system is characterized by two main parameters: access time and bandwidth. One of the main ways to reduce the access time and increase throughput is to apply a read-ahead technology. The latter consists in predicting what data will be requested next based on the data already requested, and transferring such data from the slower storage media, such as hard drives, to the faster ones, such as random access memory (RAM) and solid-state drives (SSDs) before this data is accessed. In most cases, read-ahead is used during sequential read operations.

Known from the prior art is U.S. Patent Application Publication No. US 2015032967 ("'967"), (publication date: 01.29.2015, Int. Cl. G 06 F 12/08), which describes the system and method of adaptive read-ahead. The '967 application describes a probabilistic method for determining a prefetch for caching data in a data storage system. Specifically, the '967 application proposed to utilize the principle in which, if one data block was read first, then there is a high probability of calling for reading the next data block following the first one.

Known from the prior art is U.S. Pat. No. 9,311,021 "Methods and system for performing read-ahead operations using an intelligent storage adapter" ("'021") (publication date: 04.12.2016, Int. Cl. G 06 F 3/06). In the '021 patent, the method comprises storing of the data structure by an adapter to track whether the data blocks associated with the logical unit number have been written or modified. The address of the initial logical block is retrieved to execute a read request to read data, and only those blocks are read ahead that have been written or modified.

Known from the prior art is U.S. Patent Application Publication No. US 2014250268 "Method and device for effective read-ahead from the cache" ("'268") (publication date: 09.04.2014, Int. Cl. G 06 F 12/08). In the '268 application, the method comprises identifying the largest packet length by a storage controller from the plurality of packet lengths in the memory of the storage controller for a single data stream. The solution described in the '268 application cannot be used for storage systems having a large number of clients.

Known from the prior art is U.S. Pat. No. 8,732,406 ("'406") (publication date: 05.20.2014, Int. Cl. G 06 F 12/08). The storage system proposed in the '406 patent tracks the statistical behavior of the client's read requests directed to the storage device to form predictions about the data that the client will need in the future. The storage system collects the read sequence sizes for various streams into the data structure that summarizes the previous behavior of the read requests. This data structure reports the number of streams in each equivalence class of stream sizes that are being tracked. The data structure is then used to determine the expected size of the selected read stream. In this method, the amount of data that is proposed to be read to perform read-ahead for each stream is calculated based on the length of the data stream.

Despite the existence of various ways of performing read-ahead in the data storage systems, the problem cannot be considered solved. There is a need for a more efficient read-ahead method which would improve the performance of the read-ahead systems.

SUMMARY OF THE INVENTION

The technical result achieved by this invention consists in improving the performance of a data storage system by reducing a read-ahead of unnecessary data.

The invention is implemented as follows.

The proposed method of performing read-ahead operations in the data storage systems comprises an on-going monitoring of the requests and read operations performed upon request of the data blocks representing a read stream, and is characterized by the following operations.

The interval of the sequential address space of each request and the time of the request are determined.

Next, the data related to the interval of the consecutive address space of each request and the time of the request are saved. Furthermore, these data are placed into the list of read-ahead intervals upon exceeding the threshold length of the interval of the address space to which the sequential read request is related, while the data about the intervals of requests shorter than the threshold length are placed into the list of random requests.

In the process of on-going monitoring, at least a partial coincidence is established between the interval of the address space of the current request and the interval stored in one of the lists of random request intervals and read-ahead request intervals. When the intervals coincide, the length of the interval in the corresponding list is adjusted.

After adjusting the length of the interval in the list of the random request intervals, it is checked whether the length of the address space interval exceeds the threshold length of the address space interval, and if it does, the data about this interval are transferred to the read-ahead list.

Next, the current weight of each interval in the list of read-ahead intervals is determined, which characterizes the intensity of the requests.

The relative weight of each interval in the total volume of all intervals in the list of read-ahead intervals is determined, and the data blocks are read-ahead, which are located ahead of the current reading pane of these intervals within the volume proportional to the relative weights of each interval in the list of read-ahead intervals.

The method controls the extent of read-ahead operations depending on the number of requests in the sequential read intervals and the length of these intervals. Thus, the intensity of sequential read streams is measured and the read-ahead volume is provided to the streams in proportion to their intensity. Furthermore, the intensity of consecutive intervals is measured on a continuous basis.

In particular, a list of read-ahead request intervals is arranged within the address space of a predetermined length.

In addition, a list of random request intervals is arranged within the address space of a predetermined length.

In particular, if at least a part of the interval of the address space of the current request coincides with the interval of the address space in the list of the read-ahead request intervals, the length of the interval in the list is adjusted by combining the individual intervals into one consecutive address space interval.

If at least a part of the interval of the address space of the current request coincides with the interval of the address space in the list of the random request intervals, the length of the interval in the list is adjusted by combining the individual intervals into one consecutive address space interval.

In addition, the current weight of each interval in the list of the read-ahead intervals is determined, which is equal to the ratio between the total number of all requests received within the address space of this interval and the difference between the time of the last request in the interval and the first request in the same interval.

The current weight is equal to zero, if the number of requests received within a given interval is less than a certain constant.

In particular, the read-ahead volume relative to the data blocks located outside of the current read area of these streams does not exceed a predetermined value.

In addition, if the size of the list of the read-ahead request intervals exceeds the allowable value, the intervals with the earliest timestamp of the last request are evicted.

In addition, if the size of the list of the random request intervals exceeds the allowable value, the intervals with the earliest timestamp of the last request are evicted.

DETAILED DESCRIPTION OF THE INVENTION

Figure 1:
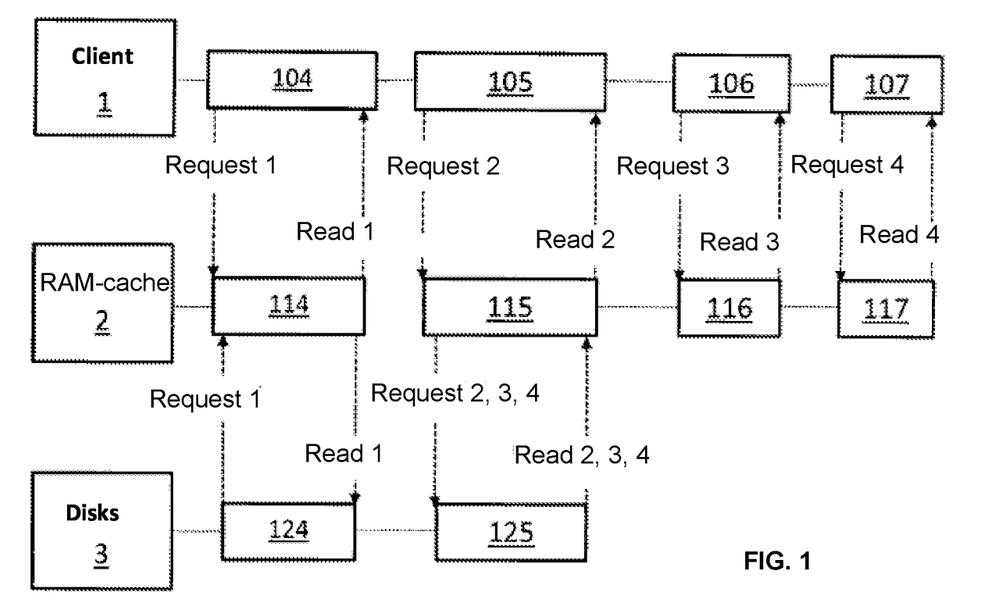
FIG. 1 shows a generalized block diagram of the read-ahead method disclosed herein.

A read-ahead method 100 performed in the data storage systems is illustrated in FIG. 1. In a preferred embodiment, a data storage system generally comprises a plurality of disks, on which data is stored, a database management system, including an input-output controller, which searches and reads data blocks asynchronously relative to the central processor, and a "scratchpad" memory buffer—cache.

As shown in method 100 of FIG. 1, Client 1 accesses a data storage system by sending requests 104, 105, 106, and 107 to read data blocks. In response to receiving requests 104 and 105, data blocks 124 and 125 are read from disks 3, which are first moved to cache 2 followed by sending data blocks 114 and 115 from cache 2 to client 1. After receiving request 105 (request 2 as shown in FIG. 1), a read-ahead decision is made. In the example illustrated in FIG. 1, the data blocks located ahead of the current reading pane of data block 125 of disk 1 are transferred to cache 2 and saved in the "scratchpad" memory of cache 2 as data blocks 116 and 117. If a request from client 1 to read data blocks 116 and 117 follows, these data clocks will be read from cache 2, which significantly speeds up the reading process. FIG. 1 illustrates an interaction with the requests of a single client, however, it is to be understood that, in general, there can be many clients 1.

Figure 2:
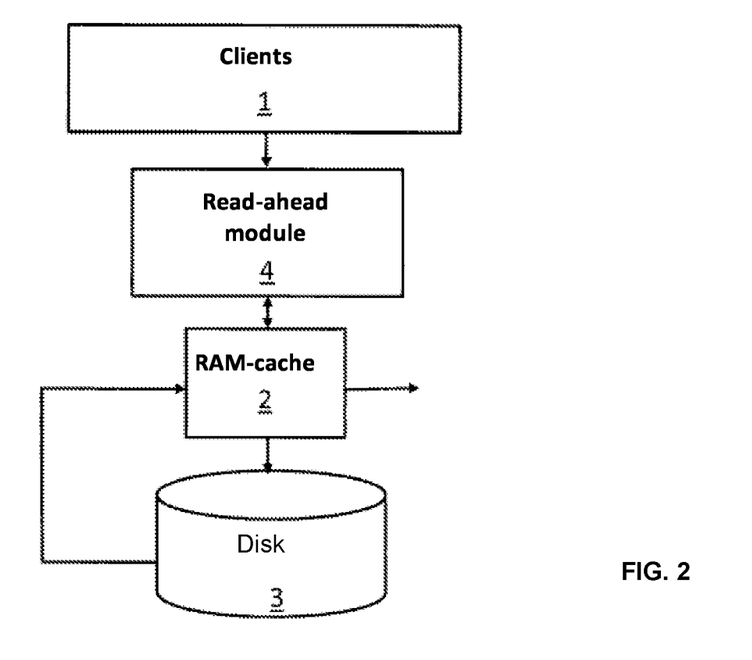
FIG. 2 shows a block diagram illustrating an apparatus for implementing a read-ahead method disclosed herein.

FIG. 2 illustrates a diagram showing the blocks of a data storage system during read-ahead operations according to this invention. The requests of clients 1 enter a read-ahead module 4, which executes the read-ahead operations according to the method disclosed herein. During read-ahead operations, only the data blocks that have not yet been requested, but are expected to be requested in cache 2 from disk 3, are read. After the actual request, these data blocks will be sent to the appropriate client from the "scratchpad memory" from cache 2.

The implementation of the read-ahead method can be divided into two steps: (a) detecting sequential read requests in the stream of all requests and (b) making a decision of whether to read-ahead the data, and in what volume. These operations are solved by a read-ahead module 4, as shown in FIG. 2.

In the modern data storage systems, a multifunctional RAM cache is usually used. This cache is intended for storing write-back data, caching recently requested data, and storing data obtained during read-ahead operations. The cache size is equal to CS. Therefore, only a part of the cache memory is used to store read-ahead blocks of data.

The read-ahead method according to this invention utilized in the data storage systems comprises continuous monitoring of the requests and read operations performed upon requests of the data blocks representing a read stream.

Upon receipt of each request, the read-ahead module 4 is configured to determine the interval of the sequential address space of the request and the time of the request. Each request is characterized by the following parameters:

lba—start address of the requested data;
len—length of the requested data, characterized by the start address and the end address of the requested data.
t—request timestamp.

The interval of the sequential address space of the request is a part of the address space that is uniquely defined by two numbers—the start address and the end address. Intervals can have a length, which is less than a constant called the "threshold length of the address space interval" (hereinafter, random intervals), and greater than the threshold length of the address space interval (hereinafter, sequential intervals). In further examples, the threshold length of the address space interval is equal to 64 megabytes.

After determining the interval of the sequential address space of the request and the time of the request, these data are saved and placed into a read-ahead list when the threshold length of the interval of the address space of the request for sequential read is exceeded, while the data about the request intervals shorter than the threshold length are placed into the random request list.

Figure 3A:
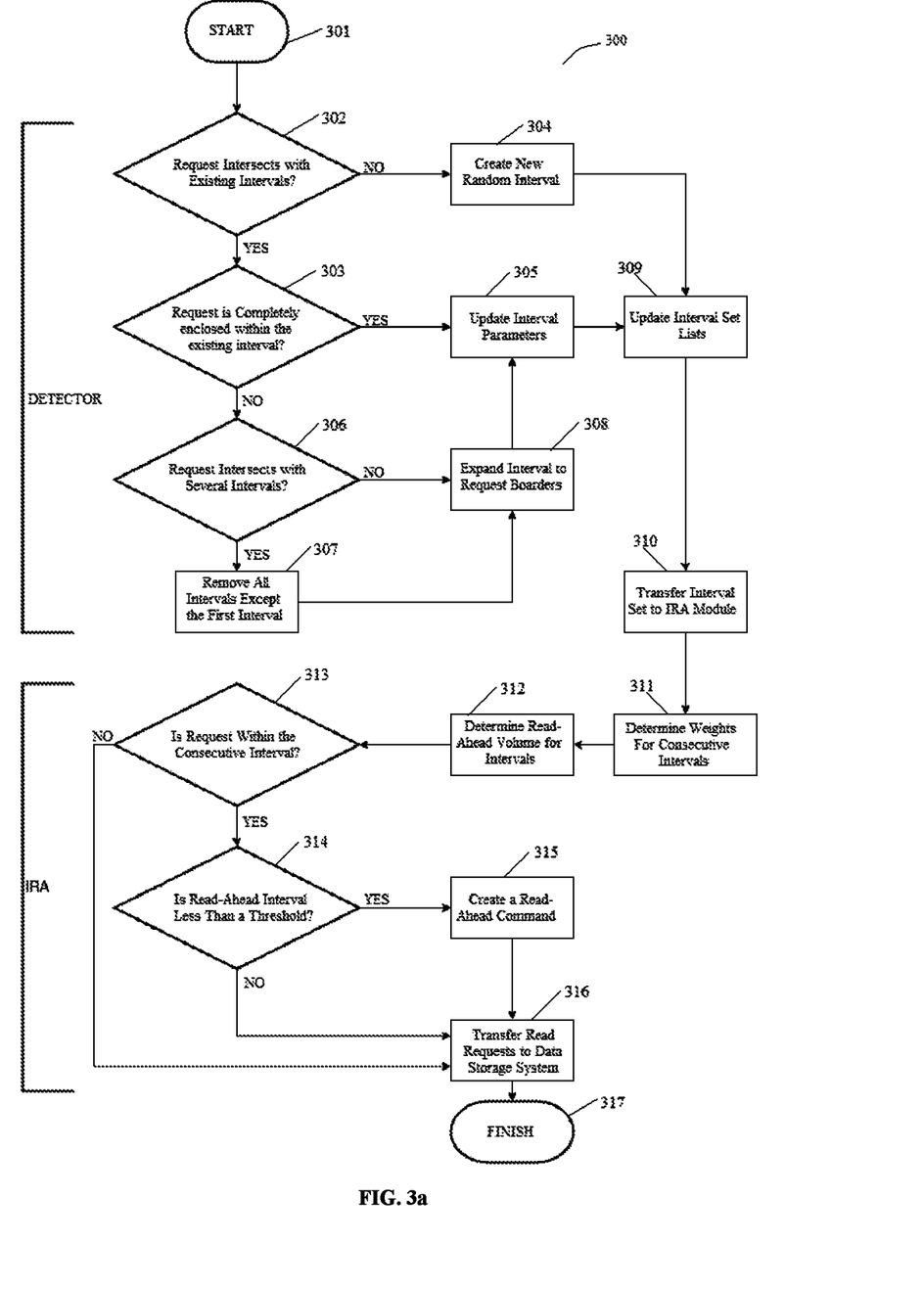
FIG. 3a shows a block diagram illustrating a read-ahead method disclosed herein.

During the process of continuous monitoring (block diagram in FIG. 3), at least a partial overlap is determined between the interval of the address space of the current request and the interval stored in one of the lists: list of random request intervals and or a list of read-ahead request intervals. When the intervals overlap, the length of the interval in the corresponding list is adjusted.

More specifically, in the process of determining whether the interval of the address space of the current request at least partially overlaps with the interval stored in one of the lists, as illustrated in FIG. 3, upon initiating the process 300 in step 301, in step 302 a determination is made whether the current request intersects with any of the existing intervals.

If a determination is made that the current request intersects with at least one existing interval, in step 303 a determination is made whether the current request is completely enclosed within the existing interval.

Conversely, if in step 302, a determination is made that the current request does not intersect with at least one existing interval, a new random interval is created in step 304.

Returning to step 303, upon determining that the current request is completely enclosed within the existing interval, process 300 proceeds with step 305 where interval parameters are updated.

If a determination is made that the current request is not completely enclosed within the existing interval, in step 306 a determination is made whether the current request intersects with more than one interval.

Upon determining that the current request intersects with more than one interval, all but the first interval are removed in step 307 and the process proceeds to step 308 where interval is expanded to the bounds of the current request.

Conversely, if in step 306 a determination is made that the current request does not intersect with more than one interval, process 300 proceeds directly to step 308 where interval is expanded to the bounds of the current request.

Upon expending the interval to the bounds of the current request in step 308, process 300 returns to step 305 where interval parameters are updated.

Once the interval parameters are updated in step 305, process 300 updates lists of all intervals in step 309.

In the preferred embodiment of the current invention, the step 309 of updating of the lists of all intervals is also invoked following the creation of a new random interval in step 304.

Upon updating the lists of all intervals in step 309, in step 310 a list of all updated intervals is transferred to a read-ahead module 4, as shown in FIG. 2.

In step 311, weighted values of consecutive intervals are determined. Upon determining weighted values of consecutive intervals in step 311, a read-ahead volume of intervals is determined in step 312.

Subsequently, in step 313 a determination is made whether a request is within the consecutive interval.

Upon determining that a request is not within the consecutive interval, process 300 proceeds to step 316 where read requests are transferred to the data storage system, i.e. disks 3, as depicted in FIG. 2, followed by the conclusion of process 300 in step 317.

Conversely, upon determining that a request is within the consecutive interval, in step 314 a determination is made whether a read-ahead interval is less than a predetermined threshold. If a determination is made that a read-ahead interval is equal or exceeds a predetermined threshold, in step 316 read requests are transferred to the data storage system, i.e. disks 3, as depicted in FIG. 2. The rationale behind the step 314 is that, generally a read-ahead is performed using a large block of data, e.g., 64 mb, so a request may be within the interval comprising data that was previously read and, thus, a read-ahead is not needed.

If, however, in step 314 a determination is made that a read-ahead interval is less than a predetermined threshold, a new read-request command is generated in step 315, followed by a transfer of read requests to the data storage system, i.e. disks 3, as depicted in FIG. 2, in step 316, followed by the conclusion of process 300 in step 317.

Figure 3B:
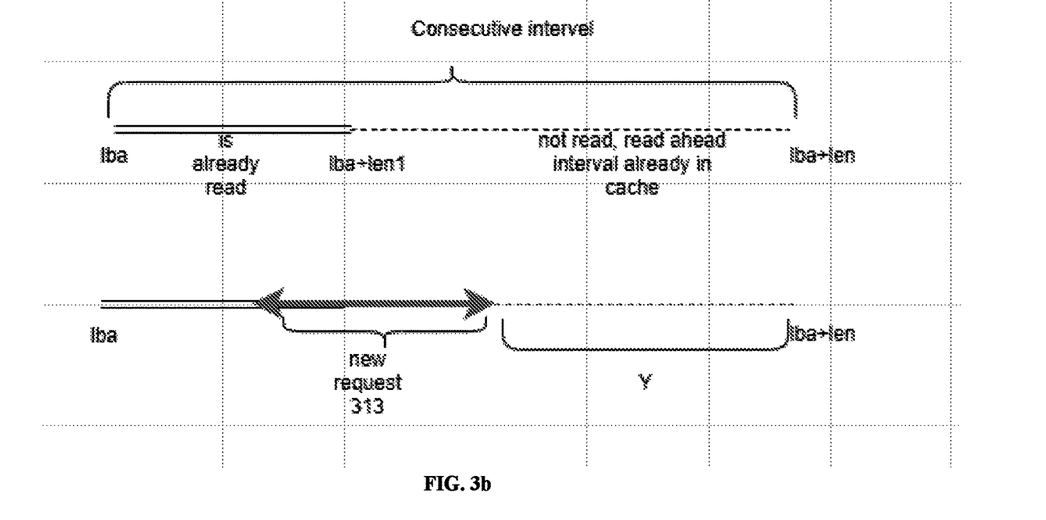
FIG. 3b shows a schematic illustration of the read-ahead method disclosed herein.

Schematic illustration of logical steps 314 through 315 or process 300 in FIG. 3 is presented in FIG. 3b. If a read-ahead interval Y is less than a predetermined threshold, a new read-request command is generated in step 315. Conversely, if a read-ahead interval Y is equal or exceeds a predetermined threshold, in step 316 read requests are transferred to the data storage system, i.e., disks 3, as shown in FIG. 2.

Figure 5:
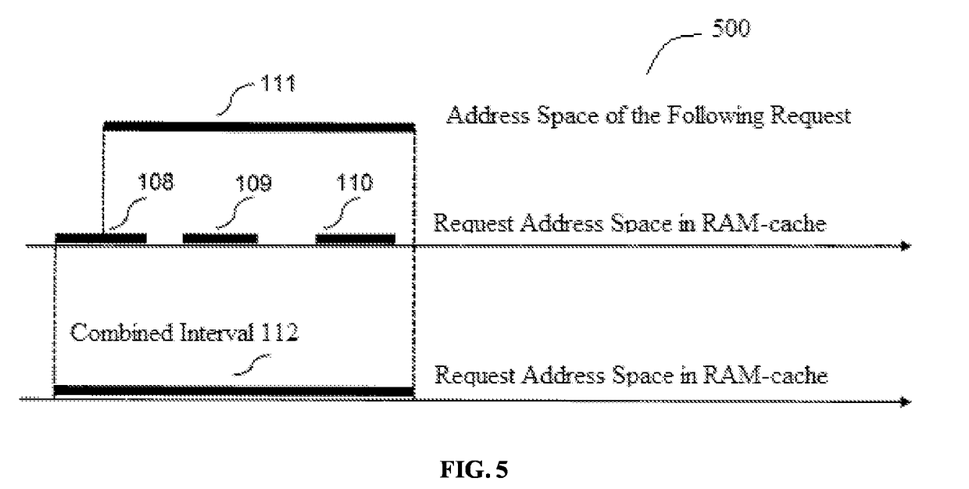
FIG. 5 shows a schematic illustration a mechanism of adjusting intervals of the address space.

The mechanism for adjusting the intervals of the address space is illustrated in steps 306-307 FIG. 5.

In an illustrative example illustrated in FIG. 5, the RAM cache 2 (as illustrated in FIG. 2), stores the intervals of the previous requests 108 through 110. The intervals of these requests are compared with the address space of the following request 111. Request interval 111 completely overlaps request intervals 109 and 110 and partially overlaps with request interval 108. The combined interval 112 includes the address spaces of all four intervals 108, 109, 110, and 111.

Accordingly, each request can: (a) be completely overlapped by any available interval in the set, (b) overlap with any interval, (c) overlap with several intervals, or (d) overlap with no intervals.

After adjusting the length of the interval in the list of the random request intervals, a determination is made whether the length of the address space interval exceeds a predetermined threshold length of the address space interval. In case the length of the address space interval exceeds a predetermined threshold length of the address space interval, the pertaining to this consecutive interval is transferred to the read-ahead list.

After the intervals are updated, the values of the updated intervals are adjusted in the list of random request intervals and in the list of read-ahead intervals.

If the size of one of the lists has become greater than a predetermined threshold, intervals with the earliest timestamp of the last request are removed from each list. In one embodiment, this operation can be performed using the Least Recently Used (LRU) algorithm.

The length of each consecutive interval should not exceed two threshold lengths of the address space interval. If the length of the updated interval exceeds this limit, its start address is shifted to the position corresponding to a difference between the end address and two threshold lengths of the address space interval. As indicated above, the threshold length of the address space interval is 64 megabytes.

The interval from the list of random request intervals can be transferred to the list of read-ahead intervals, however, the interval cannot be transferred from the list of read-ahead intervals to the list of random request intervals. Only a creation of a new interval in the list of random requests and removal of the old interval from the list of read-ahead intervals is possible.

The operations characterizing read-ahead process are described below and illustrated in FIG. 4.

Figure 4:
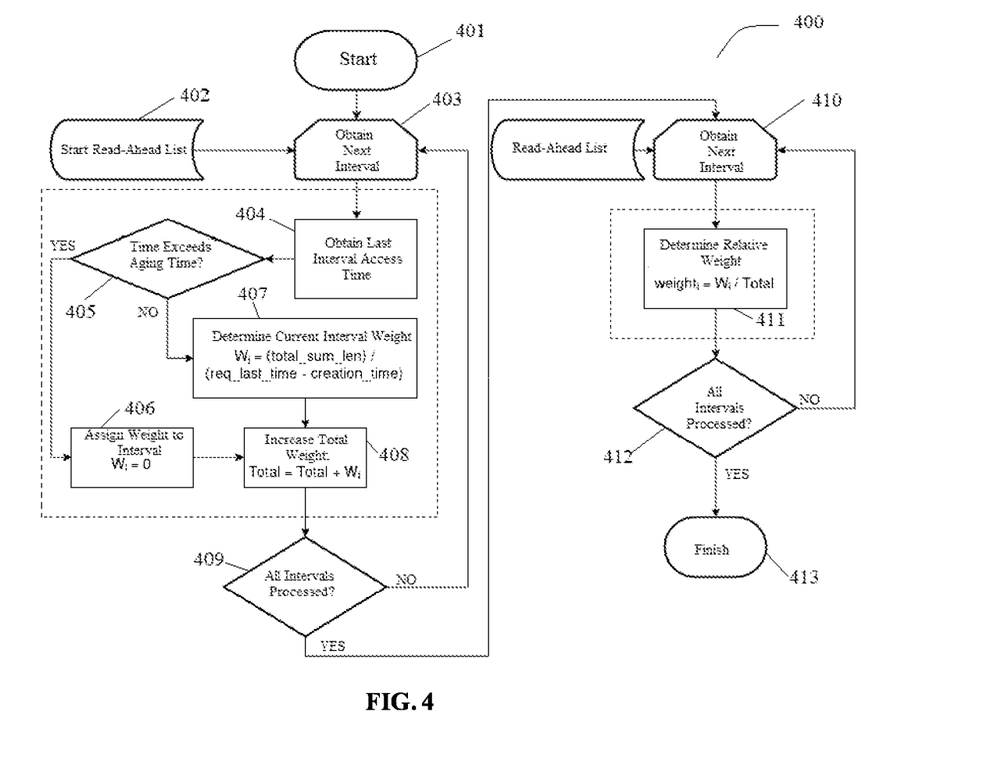
FIG. 4 shows a block diagram illustrating a method of processing intervals and determining the interval weights in the read-ahead method disclosed herein.

Specifically, the read-ahead process 400, as illustrated in FIG. 4, upon its commencement in step 401, a read-ahead list is initiated in step 402. In subsequent step 403 a new interval is received from the read-ahead list.

Upon receipt of the new interval from the read-ahead list, in step 404, a time of last interval is obtained. In a subsequent step 405 a determination is made whether the obtained time of the last interval exceeds a predetermined time threshold.

If a determination is made that the obtained time of the last interval does not exceed a predetermined time threshold, the current weight of each interval in the list of read-ahead intervals is determined in step 407. A person skilled in the art would appreciate that the current weight of each interval characterizes the intensity of the requests. Returning to step 407, for each interval (i) in the list of read-ahead intervals, weight ($W_i$) is determined, which is equal to the total length of all requests in the interval divided by the difference in timestamp of the last and first requests:

$$W_i = \frac{\text{Total\_sum\_len}}{(req_{last_{time}} - creation_{time})},$$

Where, Total_sum_len is the total length of all requests in the interval, $req_{last_{time}}$ is the timestamp of the last request in the interval, and $creation_{time}$ is the timestamp of the first request in the interval.

Upon calculating the total weight of all requests in the interval, the total weight increase is calculated in step 408.

Returning to step 405, if, however, a determination is made that the obtained time of last interval exceeds a predetermined time threshold, or if the last incoming request has a timestamp earlier than a certain time (for example, 10 seconds), the weight of the interval is assigned a zero value in step 406 and the process 400 proceeds to subsequent step 408 where the value of the total weight increase is calculated.

Upon calculating the value of the total weight increase in step 408, in step 409 a determination is made whether all intervals have been processed. If a determination is made that not all intervals have been processed, process 400 returns to step 403 where a next interval is received from the read-ahead list.

If, conversely, in step 409 a determination is made that all intervals have been processed, process 400 proceeds to step 410 where intervals from the read-ahead list are obtained again for the purposes of determining relative weights of each interval in the total volume of all intervals in the list of read-ahead intervals.

In the next step 411, the relative weight (weight) of each interval in the total volume of all intervals in the list of read-ahead intervals is determined:

$$weight_i = \frac{W_i}{\sum_i W_i},$$

where $$\sum_i W_i$$

is the sum of the weights of all intervals.

Upon determining the relative weight of each interval in the total volume of all intervals in the list of read-ahead intervals, in step 412 a determination is made whether all intervals have been processed.

If it is determined that not all intervals have been processed, process 400 returns to step 410 where a next interval is obtained from the read-ahead list. Otherwise, if it is determined that all intervals have been processed, process 400 concludes.

In other words, as soon as the interval accumulates a sufficient length exceeding the established threshold length of the address space interval, the data blocks located ahead of the current reading pane of these intervals are read. The read-ahead is performed in the amount proportional to the relative weights (weight) of each interval in the list of read-ahead intervals.

Since the cache size is limited, and the multifunctional RAM-cache performs other tasks as well, only a part of its space is dedicated for storing the information of read-ahead data blocks. Therefore, there is a limit on the maximum amount of data that can be placed in the cache region for read-ahead.

Illustrative Examples of Application of the Disclosed Invention.

Two examples of the Read-Ahead algorithm operation will be considered: a single-stream case and a multi-stream case.

It is assumed that the RAM-cache size is 8 Gigabytes. Thus, the total volume available for the read-ahead algorithm is 10%×8 GB=819 MB.

In the single-stream case, all this volume will be available for this stream. Thus, the read-ahead volume for this stream will be 819 MB.

The most efficient application of this method would be if there are several request streams. In this case, a stream represents a sequential read from the client by blocks of a certain size.

Figure 6:
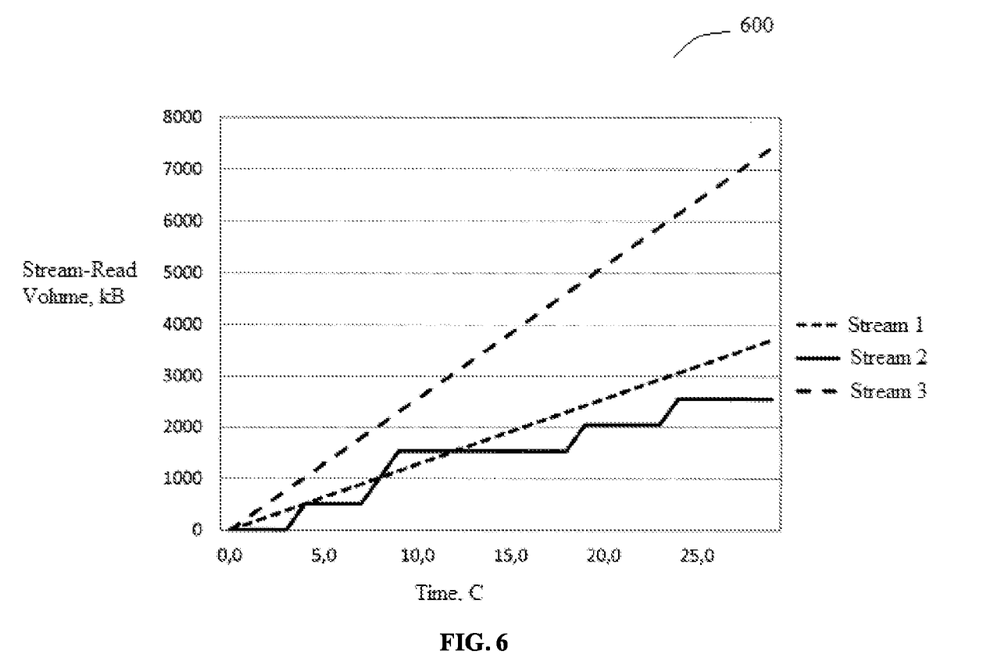
FIG. 6 shows a diagram illustrating requests processed over time, using the proposed method, with streams of different intensities.

In the example provided below, there are three defined consecutive streams, each receiving requests. The first stream steadily receives 128 kilobyte requests; the second stream receives unsteady requests, but their size is 512 kilobytes; and the third stream steadily receives 256 kilobyte requests. Thus, the accumulation of volume in each stream occurs at a different rate, as illustrated in FIG. 6.

The intensity of the stream characterized by its relative weight ($weight_i$) at a particular moment of time is defined as the volume read over the period of interval existence, i.e., as a finite difference.

The flow intensity parameters are as follows:
The intensity of the first stream is 3840/30=128.
The intensity of the second stream is 2560/26=98.5.
The intensity of the third stream is 7680/30=256.
The total intensity is 482.5.
The relative weights of the streams are as follows:
The relative weight of the first stream is 128/482.5× 100%=26.5%.
The relative weight of the second stream is 98.5/482.5× 100%=20.4%.
The relative weight of the third stream is 256/482.5× 100%=53.1%.
Thus, the read-ahead volumes will be as follows:
First stream—26.5%×819=217 MB.
Second stream—20.4%×819=167 MB.
Third stream—53.1%×819=435 MB.
Assuming that at this moment of time, a new 512 kilobyte request arrived to the second stream, the intensity of the second stream and the total intensity will change as follows:
(2560+512)/26=118.1, and
482.5−98.5+118.1=502.1.
Thus, the new relative weights will be as follows:
The relative weight of the first stream—128/502.1× 100%=25.5%.
The relative weight of the second stream—118.1/502.1× 100%=23.5%.

The relative weight of the third stream—256/502.1×
100%=51%.

The read-ahead volumes will also change as follows:

The first stream—25.5%×819=209 MB.

The second stream—23.5%×819=193 MB.

The third stream—d 51%×819=417 MB.

A person ordinarily skilled in the art will understand that FIGS. 1 through 6 are conceptual illustrations allowing for an explanation of the disclosed invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same element of hardware, firmware, or module of software could perform one or more of the illustrated or described blocks (e.g., components or steps).

In software implementations, computer software (e.g., programs or other instructions) and/or data is stored on a non-transitory machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein.

In this document, the terms "machine readable medium," "computer program medium" and "computer usable medium" are used to generally refer to non-transitory media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements.

In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

INDUSTRIAL APPLICABILITY

This read-ahead method is of particular value for the storage systems used for operating with multimedia, namely, for delivering streaming videos to many clients, as well as for taking and editing high-resolution videos. These industries have high requirements to the performance of data storage systems exactly when providing consecutive reads from multiple workstations at the same time.

The invention claimed is:

1. A method of performing read-ahead in a data storage system having data blocks, comprising:
    determining an interval of a sequential address space having a length of a request and a time of the request;
    storing the interval of the sequential address space of the request and the time of the request;
    adding the interval of the sequential address space of the request and the time of the request into a read-ahead interval list when the interval of the sequential address space exceeds a predetermined threshold length of an address space interval;
    determining at least a partial overlap between the interval of the sequential address space of the request and a stored interval stored in at least one of a random request interval list or a read-ahead interval list;
    adjusting the length of the interval of the sequential address space of the request if the interval of the sequential address space of the request and the stored interval stored in at least one of the random request interval list or the read-ahead interval list overlap;
    upon adjusting the length of the interval of the sequential address space of the request in the random request interval list, determining whether the length of a consecutive interval of the sequential address space exceeds the predetermined threshold length of the address space interval;
    storing the consecutive interval of the sequential address space in the read-ahead interval list upon determining that the length of the consecutive interval of the sequential address space exceeds the predetermined threshold length of the address space interval;
    determining a current weight of each stored interval in the read-ahead interval list;
    determining a relative weight of each stored interval in a total volume of all intervals in the read-ahead interval list; and
    performing an act of read-ahead of the data blocks stored ahead of the interval of the sequential address space of the request and the stored interval with a largest relative weight of each stored interval in the read-ahead interval list.

2. The method of claim 1, wherein the read-ahead interval list is arranged within an address space of a predetermined length.

3. The method of claim 1, wherein the random request interval list is arranged within an address space of a predetermined length.

4. The method of claim 1, wherein the length of the interval of the sequential address space is adjusted by combining stored intervals into a single consecutive address space interval when at least a part of the address space interval of the request overlap with one or more of the stored intervals stored in the read-ahead request interval list.

5. The method of claim 1, wherein the length of the interval of the sequential address space is adjusted by combining stored intervals into a single consecutive address space interval when at least a part of the address space interval of the request overlap with one or more of the stored intervals stored in the random request interval list.

6. The method of claim 1, wherein determining a weight of each stored interval in the read-ahead interval list comprises: determining a ratio between a sum of all lengths of requests received in the address space interval of the stored interval and a difference between timestamps of a last request in the stored interval and a first request in the stored interval.

7. The method of claim 6, further comprising, determining the weight of the stored interval to be a zero value when a number of requests received in the stored interval is less than a predetermined threshold.

8. The method of claim 1, wherein a read-ahead volume of data blocks located outside of a reading pane of stored intervals does not exceed a predetermined value.

9. The method of claim 1, wherein the stored interval with an earliest timestamp of a request is removed from the read-ahead request interval list when the read-ahead request interval list is greater than a predetermined threshold.

10. The method of claim 1, wherein the stored interval with an earliest timestamp of the request is removed from the random request interval list when the random request interval list is greater than the predetermined threshold.

11. The method of claim 1, further comprising adding the interval of the sequential address space of the request and the time of the request into the random request interval list.

12. System for performing read-ahead from a data storage device comprising:
a data storage system having data blocks;
a processor;
a memory having instructions stored thereon such that, when executed by the processor, cause the processor to:
determine an interval of a sequential address space having a length of a request and a time of the request;
store the interval of the sequential address space of the request and the time of the request into the processor memory;
add the interval of the sequential address space of the request and the time of the request into a read-ahead interval list in the processor memory when the interval of the sequential address space exceeds a predetermined threshold length of an address space interval;
determine at least a partial overlap between the interval of the sequential address space of the request and a stored interval stored in at least one of a random request interval list in the processor memory or a read-ahead interval list in the processor memory;
adjust the length of the interval of the sequential address space of the request if the interval of the sequential address space of the request and the stored interval stored in at least one of the random request interval list in the processor memory or the read-ahead interval list in the processor memory overlap;
determine whether the length of a consecutive interval of the sequential address space exceeds the predetermined threshold length of the address space interval;
store the consecutive interval of the sequential address space in the read-ahead interval list in the processor memory upon determining that the length of the consecutive interval of the sequential address space exceeds the predetermined threshold length of the address space interval;
determine a current weight of each stored interval in the read-ahead interval list of the processor memory;
determine a relative weight of each stored interval in a total volume of all intervals in the read-ahead interval list of the processor memory; and
perform an act of read-ahead of the data blocks stored ahead of the interval of the sequential address space of the request and the stored interval with a largest relative weight of each stored interval in the read-ahead interval list.

13. The system of claim 12, wherein the memory having instructions stored thereon such that, when executed by the processor, the read-ahead interval list is arranged within an address space of a predetermined length.

14. The system of claim 12, wherein the memory having instructions stored thereon such that, when executed by the processor, the random request interval list is arranged within an address space of a predetermined length.

15. The system of claim 12, wherein the memory having instructions stored thereon such that, when executed by the processor, the length of the interval of the sequential address space is adjusted by combining stored intervals into a single consecutive address space interval when at least a part of the address space interval of the request overlap with one or more of the stored intervals stored in the read-ahead request interval list.

16. The system of claim 12, wherein the memory having instructions stored thereon such that, when executed by the processor, determining a weight of each stored interval in the read-ahead interval list comprises:
determining a ratio between a sum of all lengths of requests received in the address space interval of the stored interval and a difference between timestamps of a last request in the stored interval and a first request in the stored interval.

17. A non-transitory computer readable medium, and computer instructions stored on the non-transitory computer readable medium such that, when executed by a processor, cause the processor to:
determine an interval of a sequential address space having a length of a request and a time of the request;
store the interval of the sequential address space of the request and the time of the request into the processor memory;
add the interval of the sequential address space of the request and the time of the request into a read-ahead interval list in the processor memory when the interval of the sequential address space exceeds a predetermined threshold length of an address space interval;
determine at least a partial overlap between the interval of the sequential address space of the request and a stored interval stored in at least one of a random request interval list in the processor memory or a read-ahead interval list in the processor memory;
adjust the length of the interval of the sequential address space of the request if the interval of the sequential address space of the request and the stored interval stored in at least one of the random request interval list in the processor memory or the read-ahead interval list in the processor memory overlap;

determine whether the length of a consecutive interval of the sequential address space exceeds the predetermined threshold length of the address space interval;

store the consecutive interval of the sequential address space in the read-ahead interval list in the processor memory upon determining that the length of the consecutive interval of the sequential address space exceeds the predetermined threshold length of the address space interval;

determine a current weight of each stored interval in the read-ahead interval list of the processor memory;

determine a relative weight of each stored interval in a total volume of all intervals in the read-ahead interval list of the processor memory; and perform an act of read-ahead of the data blocks stored ahead of the interval of the sequential address space of the request and the stored interval with a largest relative weight of each stored interval in the read-ahead interval list.

18. The non-transitory computer readable medium of claim 17, wherein the read-ahead interval list is arranged within an address space of a predetermined length.

19. The non-transitory computer readable medium of claim 17, wherein the random request interval list is arranged within an address space of a predetermined length.

20. The non-transitory computer readable medium of claim 17, wherein the computer instructions, when executed by the processor, the length of the interval of the sequential address space is adjusted by combining stored intervals into a single consecutive address space interval when at least a part of the address space interval of the request overlap with one or more of the stored intervals stored in the read-ahead request interval list.

21. The non-transitory computer readable medium of claim 17, wherein the computer instructions, when executed by the processor, determining a weight of each stored interval in the read-ahead interval list comprises:

determining a ratio between a sum of all lengths of requests received in the address space interval of the stored interval and a difference between timestamps of a last request in the stored interval and a first request in the stored interval.

\* \* \* \* \*